US009533688B1

(12) United States Patent
Lai

(10) Patent No.: US 9,533,688 B1
(45) Date of Patent: Jan. 3, 2017

(54) PLATFORM FOR ACQUIRING DRIVER BEHAVIOR DATA

(71) Applicant: Thunder Power Hong Kong Ltd., Central (HK)

(72) Inventor: Sheng-Fu Lai, Taoyuan (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 14/983,455

(22) Filed: Dec. 29, 2015

(51) Int. Cl.
G06F 17/18 (2006.01)
B60W 40/09 (2012.01)

(52) U.S. Cl.
CPC .......... B60W 40/09 (2013.01); B60W 2420/42 (2013.01); B60W 2540/30 (2013.01); B60W 2750/40 (2013.01)

(58) Field of Classification Search
USPC .......................................................... 701/36
See application file for complete search history.

(56) References Cited

U.S. PATENT DOCUMENTS

| 5,734,337 | A * | 3/1998 | Kupersmit | G01P 3/38 340/936 |
| 6,392,564 | B1 * | 5/2002 | Mackey | G08G 1/017 340/435 |
| 6,438,472 | B1 * | 8/2002 | Tano | G01C 21/26 701/25 |
| 7,254,482 | B2 * | 8/2007 | Kawasaki | G07C 5/0891 340/435 |
| 7,349,782 | B2 * | 3/2008 | Churchill | G08G 1/164 340/438 |
| 2004/0236473 | A1 * | 11/2004 | Dorey | G01M 17/007 701/1 |
| 2005/0065724 | A1 * | 3/2005 | Lee | G01S 13/825 701/408 |
| 2006/0112103 | A1 * | 5/2006 | Besserman | G06Q 10/10 |
| 2006/0171564 | A1 * | 8/2006 | Simon | G06K 9/209 382/105 |
| 2008/0262670 | A1 * | 10/2008 | McClellan | G01S 5/0027 701/31.4 |
| 2009/0207046 | A1 * | 8/2009 | Arrighetti | G06K 9/3258 340/937 |
| 2011/0187520 | A1 * | 8/2011 | Filev | B60W 50/16 340/438 |

(Continued)

Primary Examiner — Bhavesh V Amin
(74) Attorney, Agent, or Firm — Kilpatrick Townsend & Stockton LLP

(57) ABSTRACT

Described herein is an onboard vehicle system capable of gathering driver behavior to be provided to a service provider computer. In some embodiments, the onboard vehicle system includes one or more input sensors, such as camera devices, configured to capture image information surrounding the onboard system. Upon detecting another vehicle within the image information, the onboard system may determine a vehicle identifier and determine, based on the vehicle's movements, that the vehicle is exhibiting anomalous behavior. Upon detecting anomalous behavior of a vehicle within its vicinity, the onboard system may transmit an indication of the anomalous behavior and a vehicle identifier to the service provider computer to be stored in a database. In some embodiments, the information provided to the service provider computer may be accessed by one or more users over a public network.

16 Claims, 5 Drawing Sheets

(56) References Cited

U.S. PATENT DOCUMENTS

2012/0182159 A1\* 7/2012 Alipour ............ G08G 1/096725
340/928
2015/0178578 A1\* 6/2015 Hampiholi ............. G08G 1/166
348/149

\* cited by examiner

PLATFORM FOR ACQUIRING DRIVER BEHAVIOR DATA

BACKGROUND

A number of factors can make driving on roads unsafe. One such factor, the driving behavior other drivers, cannot be anticipated. Some drivers may drive recklessly, and may subsequently create a hazard for other drivers on the road. It might be possible to avoid these drivers, or make driving prohibitively expensive via insurance costs, if the reckless drivers could be identified. However, it may be difficult to identify these reckless drivers as they are unlikely to volunteer information related to their driving behavior. Furthermore, these reckless drivers are unlikely to freely allow monitoring of their driving behaviors.

SUMMARY

The present disclosure solves these and other problems with the current technology. In particular, the disclosure provides an onboard vehicle system capable of identifying driver behavior. The driver behavior is uploaded to a service provider, where it is stored in a driver database. In some embodiments, information stored in the driver database may be accessed at a later time by one or more users. In some embodiments, information stored in the driver database may be provided to a third party entity, such as an insurance provider.

BRIEF DESCRIPTION OF THE DRAWINGS

Various embodiments in accordance with the present disclosure will be described with reference to the drawings, in which.

DETAILED DESCRIPTION

Figure 1:
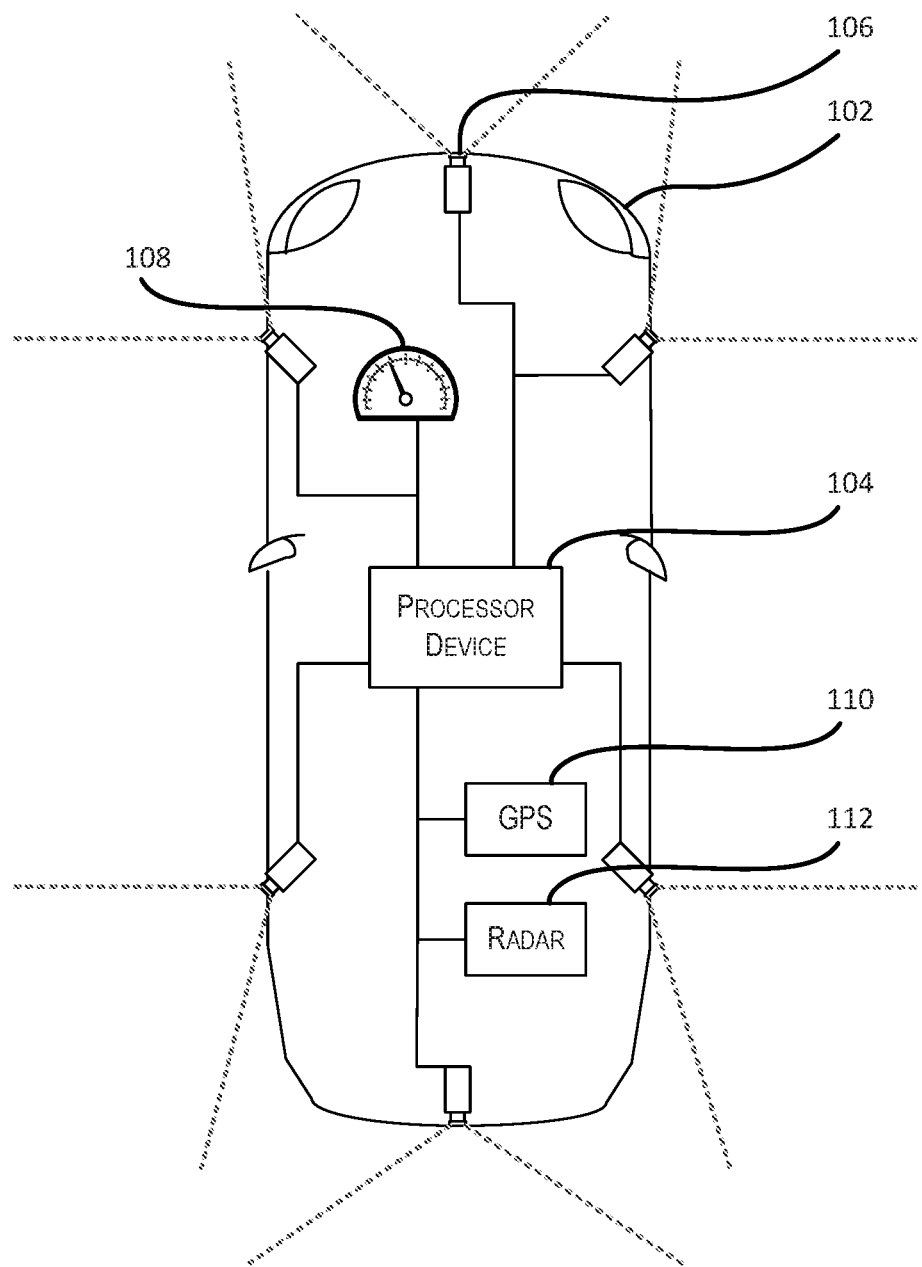
FIG. 1 depicts an onboard system for a vehicle capable of collecting and assessing driver behavior in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described herein is an onboard vehicle system capable of gathering information related to driving behavior of drivers within the vicinity of the onboard system. The onboard system may be installed in a vehicle, and may utilize one or more input sensors to identify anomalous behavior of drivers of other vehicles within the vicinity of the onboard system.

Prior to discussing specific embodiments of the invention, some terms may be described in detail.

An "anomalous behavior" is any behavior by a driver that deviates from current traffic regulations. For example, traveling at a speed above or below the current speed limit may be an anomalous behavior. In another example, crossing a centerline of a road when it is not legal to do so may be an anomalous behavior. Anomalous behavior may include swerving, driving erratically, driving too fast, driving too slow, driving outside of the bounds of a road, or any other unexpected or illegal driving behavior.

An "onboard system" may be any system housed within a vehicle. For example, an onboard system may include a number of input sensors, a processor device capable of processing data from the input sensors, a transmission means (e.g., a wireless platform), and any other suitable component. In some embodiments, the onboard system may be in communication with one or more component external to the onboard system.

A "target vehicle" is any vehicle for which the onboard system is collecting data. An onboard system may collect data for multiple target vehicles simultaneously. In some embodiments, the vehicle in which the onboard system is installed may be a target vehicle. The onboard system may identify a target vehicle and associate each of the vehicle's movements with the identified target vehicle. Additionally, the onboard system may report movements made by the target vehicle to a service provider computer.

In some embodiments, an onboard system gathers data related to movements of target vehicles within its vicinity. The onboard system may use one or more image processing techniques to determine that one or more target vehicles is exhibiting anomalous behavior. The onboard system may also identify vehicle identifiers associated with the target vehicles. Upon detecting that one or more target vehicles has exhibited anomalous behavior, the onboard system may transmit an indication of the anomalous behavior and the vehicle identifier to a service provider.

In some embodiments, the service provider may record anomalous behavior with respect to a particular target vehicle. For example, upon an onboard system detecting that a particular vehicle is speeding, the onboard system may provide the service provider with an indication of the vehicle's behavior. The service provider may record a speeding incident within a driver database with respect to the vehicle. In some embodiments, a user may access the driver database to obtain information associated with a particular vehicle and/or driver.

FIG. 1 depicts an onboard system for a vehicle 102 capable of collecting and assessing driver behavior in accordance with at least some embodiments. The onboard system 102 may include a number of input sensors capable of collecting various types of input. In addition, the onboard system may contain a processor device 104 configured to process information obtained by one or more of the input sensors included in the system.

In accordance with at least some embodiments, the input sensors included in the onboard system may comprise one or more camera devices 106 mounted at various angles on a vehicle. For example, the camera devices 106 may be configured to capture image information from one or more angles surrounding the vehicle with the onboard system. The input sensors of the onboard system may include a number of additional input sensors, such as a vehicle speedometer 108, a global positioning system (GPS) device 110, a radar system 112, or any other suitable type of input sensor. The vehicle speedometer may be any device capable of assessing the speed of a vehicle in which it is installed. A global positioning system 110 may be any device capable of detecting a geographic location of the vehicle in which the onboard system is installed. A radar system is any device capable of ascertaining the speed of a vehicle outside of the vehicle in which the onboard system is installed.

In some embodiments, a vehicle may be capable of self-identification. For example, a vehicle may be fitted with a radio frequency identifier (RFID) tag or other wireless identifier. It is envisioned that the RFID tag may be utilized in various scenarios in which vehicle identification is necessary (e.g., to pay freeway tolls). In some embodiments, the onboard system may include an input sensor that acts as an RFID reader configured to identify one or more vehicles within its vicinity.

Figure 2:
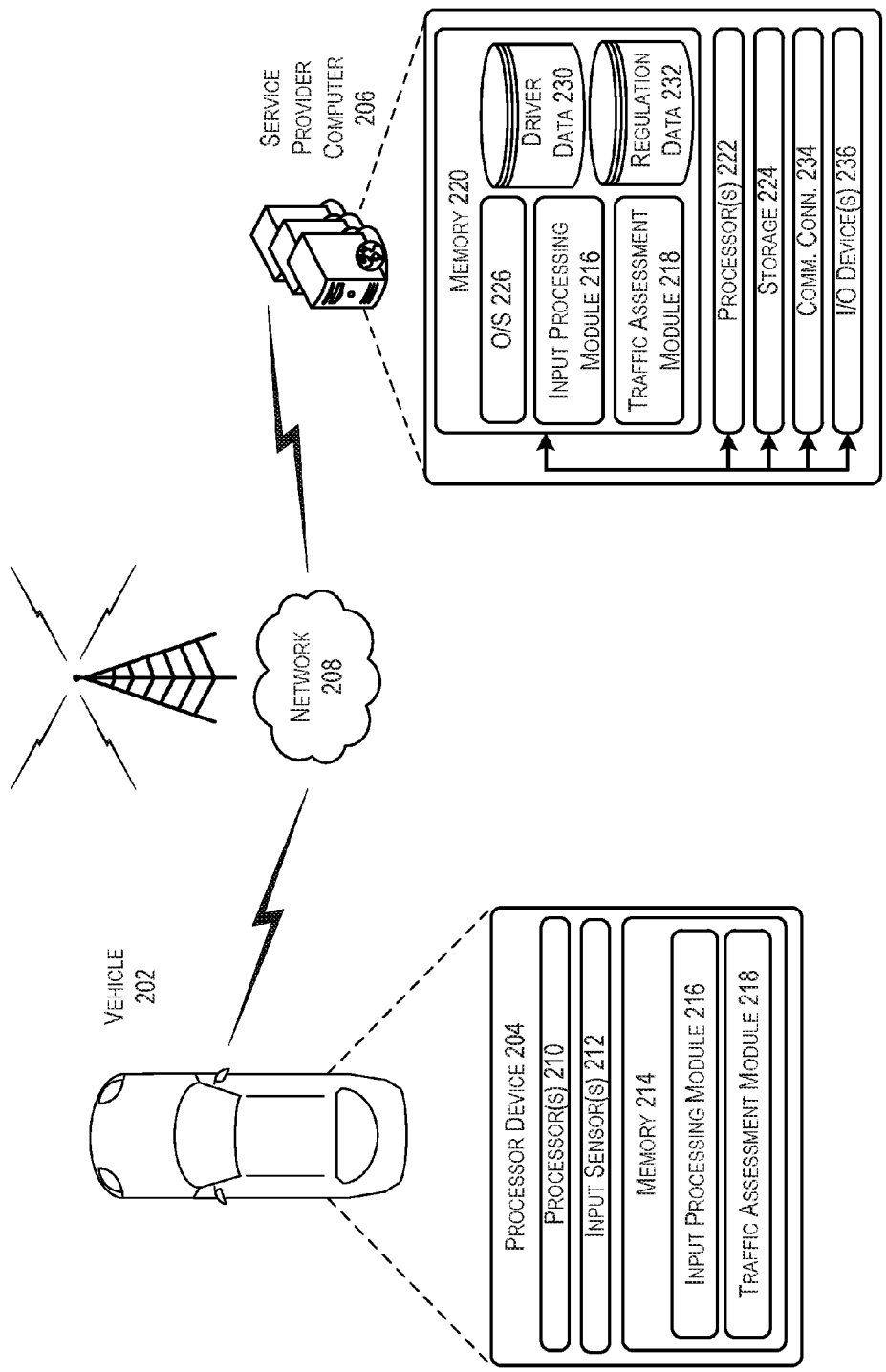
FIG. 2 depicts system or architecture in which techniques for capturing driver behavior may be implemented in accordance with the disclosure.

FIG. 2 depicts system or architecture in which techniques for capturing driver behavior may be implemented in accordance with the disclosure. In some examples, a vehicle 202 may include a processor device 204. In some embodiments, the processor device 204 may be configured to communicate with a service provider computer 206 via a network 208, or via other communication connections. The processor device 204 or the service provider computer 206 may be configured to process an image received from a camera mounted on the vehicle and determine driver behavior data.

The processor device 204 may be any type of computing device capable of performing the described functions. The processor device 204 may include one or more processors 210 capable of processing input from one or more input sensors 212. As is known in the art, there are a variety of input sensors 212 capable of detecting input related to a user or vehicle conditions, such as accelerometers, cameras, microphones, etc. The input obtained by the input sensors may be from a variety of data input types, including, but not limited to, audio data, visual data, or biometric data. Programmatic code for an application or module utilized in the implementation of at least some embodiments may be stored and executed from the memory 214 of processor device 204. The processor device 204 may include a module for processing image information to identify a vehicle (input processing module 216) and/or a module for providing identifying driver behavior (traffic assessment module 218).

In some examples, the network(s) 208 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer to-peer systems, etc.). In an exemplary embodiment, the processor device 304 may communicate with a network hub using one or more wireless communication networks (e.g., 3G, 4G, etc.). The network hub may, in turn, utilize a physical connection (e.g., copper cable, T1, Ethernet, etc.) to communicate with the service provider computer at a network address.

The service provider computer 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 206 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 210 and/or processor(s) 222, as well as data generated during the execution of these programs. Depending on the configuration and type of service provider computer 206, the memory 220 may be volatile (such as random access memory (RAM)) and/or non-volatile (such as read-only memory (ROM), flash memory, etc.). The service provider computer 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for processing image information to identify a vehicle (input processing module 216) and/or a module for providing identifying driver behavior (traffic assessment module 218). The memory 220 may also include driver data 230, which provides data related to driver behavior, and/or regulation data 232, which includes information related to traffic regulations. In some embodiments, the driver data 230 and/or the regulation data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 204 or the service provider computer 206. The service provider computer 206 may also contain communications connection(s) 234 that allow the service provider computer 206 to communicate with a stored database, another computing device or server, user terminals, and/or other devices on the network(s) 208. The service provider computer 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing driver data 230, a database containing traffic regulation data 232 and the one or more application programs or services for implementing the features disclosed herein, including an input processing module 216 and/or a traffic assessment module 218.

In some embodiments, the input processing module 216 may be configured to receive input information from one or more input sensors and identify a vehicle and/or driver associated with the captured input. For example, the input sensors may be digital camera devices used to capture an image of the vehicle to be identified. In some embodiments, the image data may comprise video data. The input processing module 216 may process the image to identify a depiction of a license plate within the captured image. Upon identifying a license plate, the input processing module may utilize one or more image processing techniques to translate a vehicle identifier (e.g., a license plate number) associated with the vehicle from the image into text. The input processing module may capture location information associated with one or more vehicles over a period of time. Additionally, the input processing module may identify other features located within the image. For example, the input processing module 216 may identify a centerline of a road being traversed. By way of a second example, the input processing module 216 may identify various traffic signs present in one or more of the images. In this example, the input processing module may determine the type of the sign based on its shape and/or color. Additionally, the input processing module may identify traffic lights and a current status of the light from image information.

In some embodiments, the traffic assessment module 218 may be configured to process information obtained from the input processing module 216 and identify driver behavior based on that information. For example, the traffic assessment module may determine, from a vehicle's location within a captured image over time, the vehicle's relative speed. The traffic assessment module may then use information obtained from the system's speedometer to determine the vehicle's actual speed. For example, if the vehicle in the captured image appears to be traveling at 10 miles per hour in the same direction as the system, and the system is traveling at 50 miles per hour, then the traffic assessment module 218 may determine that the vehicle is traveling at 60 miles per hour. In some embodiments, this speed may be compared to a speed limit ascertained from a speed limit sign. In some embodiments, this speed may be compared to a speed limit ascertained from the regulations data 232 stored at the service provider. For example, the service provider may query information related to the speed limit of the road currently being traversed by a vehicle. In another example, the traffic assessment module may determine, based on a vehicle's location with respect to various features depicted in the captured image, other types of driver behavior with respect to the vehicle. By way of illustration, the traffic assessment module may identify one or more centerlines for a road being traversed. In this illustrative example, the traffic assessment module may determine that the vehicle has crossed over the centerline. If the centerline comprises a solid yellow line on the side closest to the vehicle's previous position, then the traffic assessment module may determine that the vehicle has engaged in an illegal maneuver. In accordance with at least some embodiments, the traffic assessment module 218 may report the driver's behavior to the service provider, which may subsequently record the data in the data store containing driver data 230. In accordance with at least some embodiments, the service provider may contact local authorities. For example, upon determining that the vehicle is swerving, the service provider may communicate the vehicle's license plate information and location (e.g., GPS coordinates or route information) to a local police department.

Although described as being executed from the memory 220 of the service provider computer 206, the input processing module 216 and/or the traffic assessment module 218 may be located on, and executed from, the memory 214 of the processor device 204. In embodiments in which one or more of the modules are included at the service provider, the processor device 204 may transmit information obtained from the input sensors to the service provider 206 to be processed at the service provider. For example, the processor device 204 may provide streaming video to the service provider 206.

Figure 3:
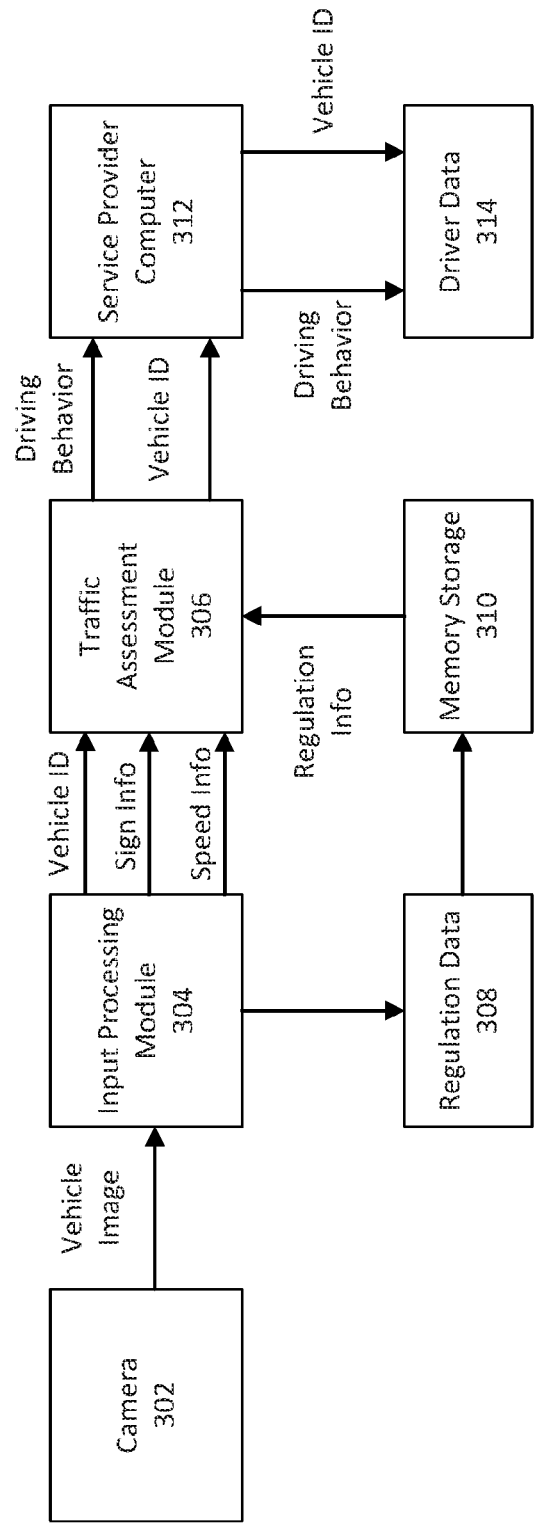
FIG. 3 depicts an illustrative flow diagram illustrating a process for gathering vehicle driver behavior data in accordance with at least some embodiments.

FIG. 3 depicts an illustrative flow diagram illustrating a process for gathering vehicle driver behavior data in accordance with at least some embodiments. In FIG. 3, one or more input sensors may be mounted on or within a vehicle. In some embodiments, the input sensors may include sensors typically installed in, and used in the operation of, the vehicle. In one example, an input sensor may be a camera device capable of capturing image data. In a second example, an input sensor may be a vehicle's speedometer, which is capable of tracking the vehicle's speed. Depicted in FIG. 3 is an illustrative example in which the input sensors comprise one or more camera devices 302.

Image information captured by the one or more camera devices 302 may be processed at an input processing module 304. The input processing module 304 may be an example input processing module 216 of FIG. 2. In some embodiments, the input processing module may utilize machine vision and/or one or more image processing techniques to identify a target vehicle within the captured image information. The input processing module may identify license plate information within the image information and may subsequently translate the license plate information into textual data using the one or more image processing techniques. Once the input processing module 304 has identified a target vehicle, it may be configured to track the target vehicle's movement data. The input processing module 304 may be configured to identify one or more road signs that indicate appropriate traffic behavior, as well as boundary indicators (e.g., road centerlines). In some embodiments, the input processing module 304 may be configured to determine the speed of a vehicle in the captured image information. For example, the input processing module may determine the speed that the vehicle is moving with respect to the system, (e.g., by tracking the vehicle's image location with respect to time) and calculate the vehicle's speed based on the speed of the system (e.g., by accessing the system's speedometer).

As the input processing module 304 identifies image data from the captured image input, it may transmit one or more pieces of data to a traffic assessment module 306. For example, the input processing module 304 may transmit a vehicle identifier for the target vehicle (e.g., the vehicle's license plate information), information collected from traffic signs (e.g., speed limits, stop signs, etc.), and/or information related to the speed (or behavior) of a target vehicle to the traffic assessment module 306. The traffic assessment module 306 may be an example traffic assessment module 218 of FIG. 2.

In some embodiments, the described system may include regulation data 308. For example, the system may include a memory storage 310 that includes traffic rules and/or regulations. The rules may be stored in a database or as text-based documents (e.g., extensible markup language (xml) documents). In some embodiments, the rules may be provided to the system prior to the operation of the system (e.g., provided by a manufacturer of the vehicle). In some embodiments, the rules may be geographic in nature. For example, the regulation data 308 may include a posted speed limit for a particular stretch of a road. The system may utilize GPS coordinates to determine which of the stored rules, if any, are applicable in the current context. In some embodiments, the regulation data may be updated by the input processing module 304. For example, upon identifying a speed limit sign, the input processing module 304 may be configured to update the current speed limit with the speed limit indicated on the speed limit sign. In another example, upon determining that the centerline of the road has changed, the input processing module 304 may update the regulation data to indicate whether passing another vehicle using the oncoming lane is currently allowed.

The stored regulation data 308 may be utilized by the traffic assessment module 306 to determine whether the target vehicle is operating within the bounds of the current traffic regulations. For example, the traffic assessment module 306 may compare the target vehicle's current speed to the speed limit indicated in the regulation data 308. In another example, the traffic assessment module 306 may receive an indication that the target vehicle has crossed over a centerline. The traffic assessment module 306 may determine, if the regulation data 308 indicates that passing using the oncoming lane is currently not allowed, that the target vehicle has illegally crossed into the lane. Upon determining that the target vehicle has exhibited anomalous behavior, the traffic assessment module 306 may transmit an indication of the anomalous behavior and the vehicle identifier to a service provider computer 312. The service provider computer 312 may store the indication of the anomalous behavior in a driver database 314. In some embodiments, the service provider may notify a law enforcement agency upon receiving the indication of the anomalous behavior. For example, the driver database may contain one or more account profiles, each associated with a vehicle and/or driver. In some embodiments, a driver may be associated with multiple vehicles. In some embodiments, a vehicle may be associated with multiple drivers. A vehicle identifier and/or driver identity may act as a unique key for the driver database 314.

In some embodiments, the driver database 314 may be accessed by one or more users via a network connection. For example, a user may submit a query to the service provider computer 312 via a client device to access information associated with one or more driver. In some embodiments, the driver data 314 may be accessed to provide an assessment of a driver's typical driving behavior and/or risk. For example, the driver data 314 may be used by an insurance agency to calculate a rate that should be charged to the driver for insurance coverage or an amount of coverage that may be provided. In some embodiments, information associated with one or more drivers may be provided to a second vehicle so that a driver of the second vehicle may be apprised of likely behavior of vehicles around him or her.

Figure 4:
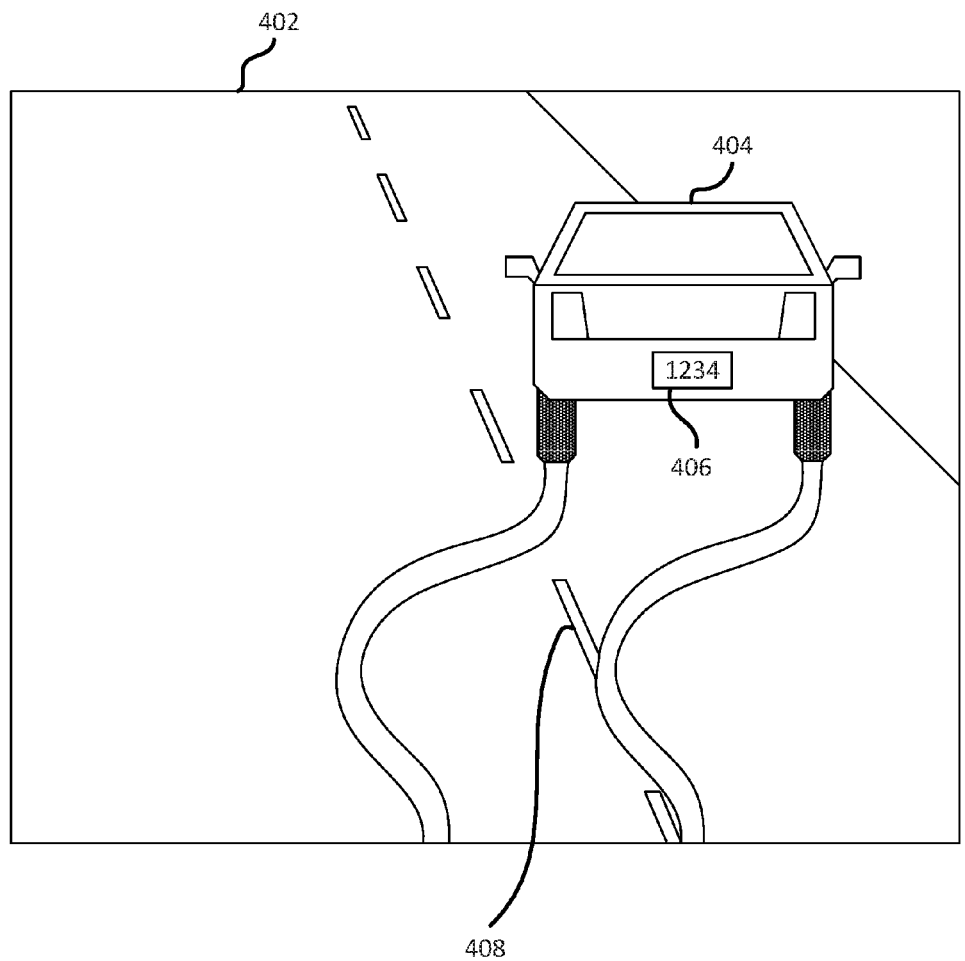
FIG. 4 depicts an illustrative example of an image that may be captured by a digital camera device of the onboard system in accordance with at least some embodiments.

FIG. 4 depicts an illustrative example of an image that may be captured by a digital camera device of the onboard system in accordance with at least some embodiments. In FIG. 4, an image 402 may be captured by a camera device included in an onboard system. The captured image may include image information related to a vehicle 404.

In some embodiments, the onboard system may identify a portion of the image information that corresponds to an image of a license plate 406. Upon identifying a potential license plate, the onboard system may translate image information into textual data. For example, the onboard system may utilize one or more image processing techniques to determine the license plate number of the target vehicle.

In some embodiments, the onboard system may utilize a radar gun or other speed detection device to determine the speed at which the identified target vehicle is traveling. Upon detecting the target vehicle's speed, the onboard system may determine whether the target vehicle's speed is within an acceptable range of speeds. In some embodiments, the onboard system may identify a centerline 408 of a road that the target vehicle is traveling upon. The onboard system may determine the type of centerline that is currently present. The onboard system may then determine whether the target vehicle has illegally crossed the centerline. In some embodiments, the onboard system may determine that the target vehicle is swerving or otherwise driving erratically. For example, the onboard system may determine that the target vehicle has moved back and forth several times within its lane of travel.

Upon identifying one or more anomalous driving behaviors from the captured image information 402, the onboard system may transmit information related to the identified anomalous behaviors, as well as the vehicle license 406 information, to a service provider computer to be stored in a driver database.

Figure 5:
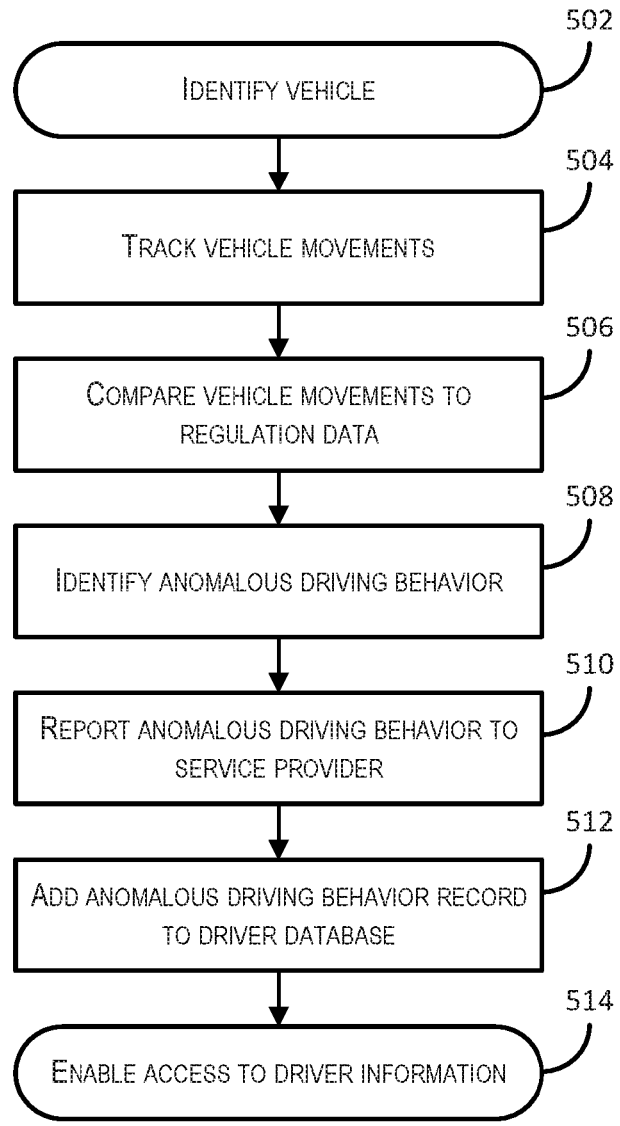
FIG. 5 depicts an illustrative flow chart demonstrating an example process for gathering anomalous driving behavior in accordance with at least some embodiments.

FIG. 5 depicts an illustrative flow chart demonstrating an example process for gathering anomalous driving behavior in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the one or more service provider computers 206 shown in FIG. 2. The code may be stored on a computer-readable storage medium, for example, in the form of a computer program including a plurality of instructions executable by one or more processors. The computer-readable storage medium may be non-transitory.

Process 500 may begin at 502, when a vehicle is identified from captured image information obtained by an onboard vehicle system. In some embodiments the image information may comprise images collected from multiple cameras attached to a vehicle at different angles. The onboard vehicle system may identify and track multiple vehicles within the image information simultaneously. In some embodiments, the onboard vehicle system may track a vehicle's movements with respect to the onboard system and/or with respect to the lane of travel at 504.

In some embodiments, the onboard system may compare the movement data of a target vehicle to regulation data stored in memory at 506. For example, the onboard system may compare the speed of the target vehicle to speed limit data for the current lane of travel. If the vehicle movement violates one or more regulations outlined in the regulation data, then the onboard system may determine that the target vehicle is displaying anomalous behavior. The onboard system may identify any violation of the regulation data to be an anomalous behavior. For example, upon determining that the speed of the target vehicle is different from the speed limit data for the current lane of travel, the onboard system may identify this data as anomalous driving behavior and report it to a service provider computer at 510.

In some embodiments, the onboard system may identify a safe distance threshold (e.g., a minimum distance that two vehicles should be from each other) from the regulation data. In some embodiments, the safe distance threshold may be calculated based on a speed of a target vehicle. For example, the safe distance may increase with the speed that the target vehicle is traveling. In this example, the onboard system may determine that two vehicles are too close by determining that the distance between them is less than the safe distance. In some embodiments, the onboard system may report this as an incident involving both vehicles to the service provider computer at 510. In some embodiments, the onboard system may determine that one of the vehicles in the above scenario is at fault. For example, the onboard system may determine that Vehicle A and Vehicle B came within a distance that was less than the safe distance threshold, and that Vehicle B also crossed a centerline. In this scenario, the onboard system may determine that Vehicle B attempted to change into a lane without noticing that Vehicle A was already in the lane. The onboard system may report Vehicle B's behavior to the service provider. Likewise, in a scenario in which Vehicle B is following Vehicle A, and the two vehicles approach within the safe distance, the onboard system may determine that Vehicle B is following too closely and may report Vehicle B's behavior to the service provider computer.

In some embodiments, the service provider computer may determine which reported driver behavior data should be recorded in the driver data at 512. In some embodiments, the service provider computer may determine whether the driving behavior is within an acceptable range of behavior. For example, if the service provider computer receives an indication that Vehicle A was traveling at 2 miles per hour over the speed limit, then the service provider may determine that this is acceptable and may elect not to record the incident. In some embodiments, the service provider computer may record all incidents that are reported to it. In some embodiments, behavior may be removed from the driver database after a predetermined time period. For example, driver behavior data that is more than seven years old may be periodically removed from the driver database.

In some embodiments, the service provider computer may provide access to behavior data for one or more drivers and/or vehicles at 514. In some embodiments, A user may be given the ability to log into an account maintained by the service provider and query driving behaviors for a particular driver. For example, a user employed by an insurance agency may wish to check driving behavior for a particular driver prior to providing coverage to that driver. In this scenario, the insurance agency may be provided with a list of driving behaviors displayed by the potential insuree. In another example, a parent may log in to check on his or her child's driving behavior. In this example, the parent may be provided with a list of driving behaviors exhibited by his or her child.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An onboard vehicle apparatus, comprising:
   one or more camera devices configured to capture image input related to one or more vehicles;
   a processor device configured to:
   receive image input from the one or more camera devices;
   identify, from the received image input, an identifier of a target vehicle associated with the image input, the target vehicle being a vehicle other than one in which the onboard vehicle apparatus is installed, the identifier of the target vehicle being a license plate number;
   track one or more movements of the target vehicle using the one or more camera devices;
   identify one or more regulations relevant to the target vehicle;
   determine, by analyzing the one or more movements of the target vehicle with respect to the one or more regulations relevant to the target vehicle, that the target vehicle is engaged in an anomalous behavior, the anomalous behavior determined based on a deviation from at least one traffic regulation; and
   provide, via wireless transmission, behavior information to a service provider computer, the behavior information including the identifier of the target vehicle and information related to the anomalous behavior, wherein the service provider computer is further configured to:
   identify, by querying a database that relates drivers to vehicle identifiers, a driver from the vehicle identifier;
   identify a record of anomalous behavior associated with the identified driver;
   append the behavior information to the record of anomalous behavior, the record of anomalous behavior being accessible via a web browser over a public network;
   receive an indication of the identifier of the target vehicle from a second onboard vehicle apparatus; and
   provide, to the second onboard vehicle apparatus, the record of the anomalous behavior that includes the behavior information.

2. The onboard vehicle apparatus of claim 1, wherein the received image input is an image depicting at least a portion of the target vehicle.

3. The onboard vehicle apparatus of claim 2, wherein the vehicle identifier is identified using one or more image processing techniques.

4. The onboard vehicle apparatus of claim 1, wherein the behavior information provided to the service provider includes the received image input.

5. The onboard vehicle apparatus of claim 1, wherein the processor device is further configured to provide, via wireless transmission, the behavior information to a local law enforcement agency.

6. A method comprising:
   receiving, from a camera device installed on a first vehicle, image information including at least a portion of a target vehicle other than the first vehicle;
   identifying, from the image information, a vehicle identifier associated with the target vehicle, the vehicle identifier comprising a license plate number;
   tracking, within the image information, a movement of the target vehicle;
   determining a set of regulation data relevant to the target vehicle, the set of regulation data determined based on a geographic location of the first vehicle;
   determining, based at least in part on the movement of the target vehicle with respect to the set of regulation data, that the target vehicle is engaged in an anomalous driving behavior;
   providing, via wireless transmission to a service provider computer, the vehicle identifier of the target vehicle and the anomalous driving behavior, such that the service provider computer is caused to:
   identify a driver from a driver database based on the identifier of the target vehicle;
   append the anomalous driving behavior to a driving record associated with the identified driver; and
   provide the driving record associated with the identified driver to a second vehicle upon receiving a request related to the driver.

7. The method of claim 6, wherein the image information is stored at the service provider for future reference.

8. The method of claim 7, wherein a user is able to view the stored image information or the driving record via a network connection.

9. The method of claim 6, wherein the target vehicle is at least two vehicles and the anomalous driving behavior is the two vehicles coming into proximity below a safe distance threshold.

10. The method of claim 9, wherein multiple vehicle identifiers are identified as being associated with each of the at least two vehicles, the multiple vehicle identifiers being provided to the service provider.

11. A service provider computer, comprising:
    a processor device; and
    a memory including instructions that, when executed with the processor device, cause the system to, at least:
    receive, from an onboard system installed in a first vehicle, image information related to a driving behavior exhibited by at least one target vehicle other than the first vehicle;
    identify, from the captured image information, a vehicle identifier of the at least one target vehicle, the vehicle identifier including a vehicle license plate number;
    identify, based on a location of the first vehicle, at least one regulation relevant to the at least one target vehicle;
    determine, based on the at least one regulation and the image information, that the driving behavior is an anomalous driving behavior;
    determine, by querying a data store including relationships between vehicle identifiers and vehicle drivers, a vehicle driver associated with the at least one target vehicle;
    store an indication of the driving behavior in a database with respect to a driving record associated with the vehicle driver, such that the indication of the driving behavior may be accessed by a second onboard system.

12. The service provider computer of claim 11, wherein the instructions further cause the system, to at least:
    receive, from a client device via a network connection, a request to provide the stored indication of the driving behavior; and
    provide, to the client device, the stored indication of the driving behavior.

13. The service provider computer of claim 11, wherein the request is received via a public network.

14. The service provider computer of claim 11, wherein the driving behavior is one of swerving, driving erratically, driving too fast, driving too slow, or driving outside of the bounds of a road.

15. The onboard vehicle apparatus of claim 1, wherein the one or more regulations relevant to the target vehicle are identified based on a current geographic location of the target vehicle.

16. The onboard vehicle apparatus of claim 1, wherein multiple behavior information associated with the target vehicle is provided to the service provider computer by multiple onboard vehicle apparatuses, and the multiple behavior information is made available, by the service provider computer, to a driver associated with the target vehicle.

* * * * *